United States Patent [19]

Bee

[11] Patent Number: 5,044,164

[45] Date of Patent: Sep. 3, 1991

[54] METHOD OF PREPARING A CHEMICAL COMPOUND

[75] Inventor: Rodney D. Bee, St. Neots, Great Britain

[73] Assignee: Van den Bergh Foods Co., Division of Conopco, Inc., Lisle, Ill.

[21] Appl. No.: 335,618

[22] Filed: Apr. 10, 1989

[30] Foreign Application Priority Data

Apr. 8, 1988 [GB] United Kingdom ............... 8808330

[51] Int. Cl.$^5$ ............................................. F17C 11/00
[52] U.S. Cl. ..................................... 62/46.1; 62/54.1; 62/70
[58] Field of Search .................... 62/46.1, 54.1, 69, 70

[56] References Cited

U.S. PATENT DOCUMENTS

| 2,975,603 | 3/1961 | Barns et al. | 62/69 |
|---|---|---|---|
| 3,255,600 | 6/1966 | Mitchell | 62/69 |
| 3,393,152 | 7/1968 | Smith et al. | 62/46.1 |
| 4,011,730 | 3/1977 | Rosenberg et al. | 62/54.1 |
| 4,285,977 | 8/1981 | Yezek et al. | 62/46.1 |
| 4,295,346 | 10/1981 | Hoffmann | 62/46.1 |
| 4,341,078 | 7/1982 | Wettzen | 62/46.1 |
| 4,393,660 | 7/1983 | Kleiner et al. | 62/69 |
| 4,398,394 | 8/1983 | Kleiner et al. | 62/69 |
| 4,398,395 | 8/1983 | Hinman et al. | 62/69 |
| 4,404,807 | 9/1983 | Zemelman et al. | 62/69 |

FOREIGN PATENT DOCUMENTS 0330578 8/1989 European Pat. Off. .

Primary Examiner—Ronald C. Capossela
Attorney, Agent, or Firm—Rimma Mitelman

[57] ABSTRACT

A method of preparing a clathrate of a gas-hydrate-forming material and water by preparing a dispersion of liquid water in a continuous fluid phase comprising the gas-hydrate-forming material and controlling the temperature and the pressure such that a clathrate is formed.

12 Claims, 1 Drawing Sheet

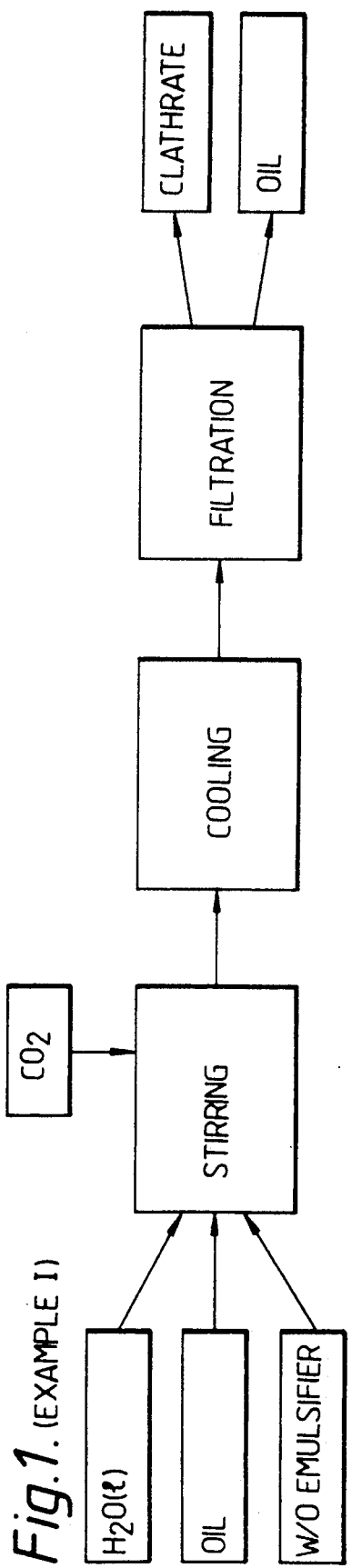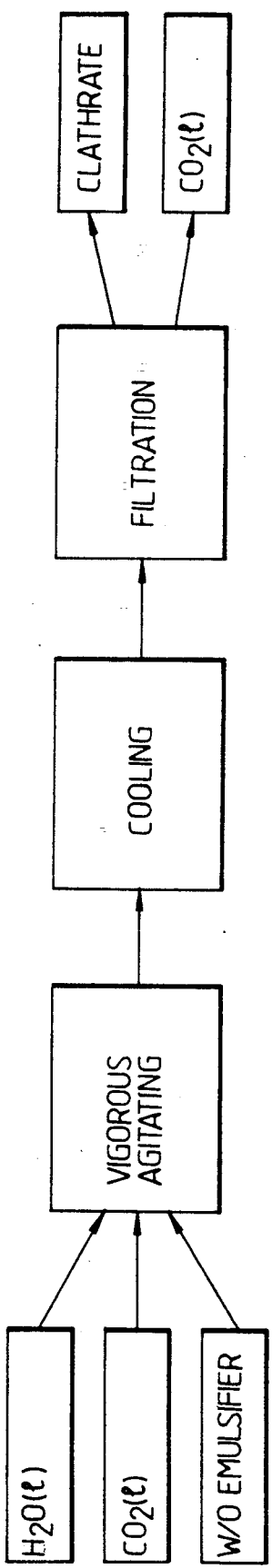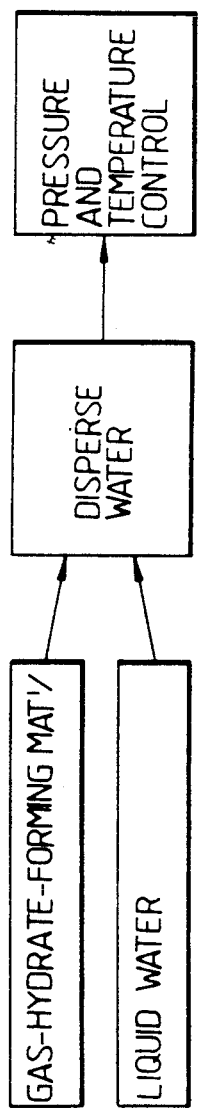

METHOD OF PREPARING A CHEMICAL COMPOUND

The invention relates to a method of preparing a clathrate of at least one gas-hydrate-forming material and water, possibly containing small amounts of other compatible compounds, wherein the gas-hydrate-forming-material is dissolved into liquid water, possibly containing the other compounds, after which the product formed thereby is solidified.

A method as described above is known from U.S. Pat. No. 4,393,660 disclosing dissolving a gas-hydrate-forming compound, such as nitrous oxide, chlorine and carbon dioxide, into an aqueous liquid under conditions of temperature and pressure suitable to form a stable hydrate and freezing the resulting product. For obtaining a particulate product the resulting product may be granulated, such as by crushing.

An object of the invention is the provision of a well controllable method with regard to both composition and particle size, which may be used for continuous production and which may be used for producing high gas content clathrated products.

In accordance with the present invention it has been found that these objects can be met if a dispersion of liquid water in a continuous fluid phase comprising the gas-hydrate-forming material is prepared and the temperature and pressure of this dispersion are controlled such that a clathrate is formed.

Preferably, the continuous phase consists at least predominantly of gas-hydrate-forming material, which is in an even more preferred embodiment liquid. This may be practically effected by choosing suitable conditions of temperature and pressure from the phase diagram $H_2O$—$CO_2$ and incorporating liquid water in liquid carbon dioxide as the disperse phase. In this case too, the formation of the emulsion is assisted by the incorporation of a suitable water-in-oil emulsifier of low HLB, such as "Admul W.O.N.", obtainable from Quest International, Ashford, England, or sorbitan monooleate and analogous esters.

More particularly, this invention is directed to a method as referred to hereinbefore, wherein water is in a dispersed condition in a continuous liquid phase in which the gas-hydrate-forming compound is more soluble than in the water phase, optionally containing compatible compounds.

Another preferred alternative is spraying water as an aerosol into a gas atmosphere constituting a gaseous continuous phase and comprising the gas-hydrate-forming material at pressure and temperature conditions suitable for forming clathrate. Very suitably the gas atmosphere entirely or at least mainly consists of gaseous gas-hydrate-forming material, such as mentioned hereinbefore.

In a preferred embodiment of the invented method wherein the continuous phase has a lower solidification point than the clathrate-forming temperature under the same conditions, the temperature is controlled such that the continuous phase does not solidify and thereafter the clathrate particles are separated from said continuous phase. For this separation step any suitable known method may be used, such as filtering and centrifuging.

Alternatively, the temperature of the product obtained may be lowered after the clathrate formation so as to freeze at least some of the continuous phase containing the clathrate particles. This method may be applied if the material forming the continuous phase is not interfering with the expected future use of the clathrate.

Although a dispersion of solid aqueous particles in a liquid continuous phase may be used with acceptable results, preferably an emulsion of liquid aqueous droplets emulsified in the continuous phase is used since the size control of the droplets is very easy, and the size distribution of the droplets may be made relatively monodispersed.

In case carbon dioxide is the gas-hydrate-forming material, oil is a preferred main constituent of the continuous phase.

The above described methods are particularly well-suited for preparing $H_2O$—$CO_2$ clathrates.

The invention will be exemplified in the following description of two embodiments of the invented method, second of which is preferred at present.

BRIEF DESCRIPTION OF THE DRAWING

FIGS. 1 and 2 of the drawings illustrate the steps of the process described in Examples I and II respectively.

FIG. 3 illustrates the process wherein the clathrate is formed by controlling the pressure and temperature of the dispersion.

EXAMPLE I

A 20% suspension of water in an edible, vegetable oil (for example bean oil) is prepared by emulsification with a Silveson stirrer in the presence of a suitable w/o emulsifier (e g. 3% Admul W.O.L. calculated on the weight of oil) with stirring to give an average water droplet size of between 50 and 300/$\mu$m. The suspension is exposed to an atmosphere of 30 atm. of $CO_2$ at a temperature (suitably about 15° C.), at which temperature no $CO_2$-gas hydrate forms. The temperature is then lowered to 10° C. or lower, depending on the nucleation of the gas hydrate or ice crystals.

After complete formation of the gas hydrate or freezing of the residual water (if the temperature is lowered sufficiently), the finely divided gas hydrate/ice mixture is physically removed from the suspending oil, such as by filtration. The carrying liquid oil is then re-used in a next cycle.

EXAMPLE II

A 10% suspension of water in liquid $CO_2$, with water droplets in the range of 50 to 1000/$\mu$m, is formed by vigorously agitating a mixture of the two liquid phases in the presence of 0.5% w/w of a commercial polyglycerol ester of a fatty acid as emulsifying agent. The temperature and pressure should be in the liquidus region for both water and $CO_2$ in the phase diagram. The $CO_2$ is admitted to the reaction vessel through a mass detector to monitor the $CO_2$ content of the mixture.

Continuous gentle agitation is used to ensure homogeneous distribution of the water droplets. At the same time the temperature is lowered to bring conditions progressively into the hydrate-forming region, for that particular gas hydrate, until gas hydrate crystals are nucleated.

The temperature is then progressively lowered, typically to −20° C., at which time the unbound $CO_2$ can be removed by any classical physical separation technique, such as filtration.

The product at −20° C. is then returned to atmospheric pressure and stored under conditions usually employed by those experienced in handling gas hydrates.

What is claimed is:

1. Method of preparing a clathrate of a gas-hydrate-forming material and water, the method comprising:
   (i) preparing an emulsion of liquid water in a continuous fluid phase including the gas-hydrate-forming material while using a water-in-oil emulsifier; and
   (ii) controlling the temperature and pressure of the emulsion such that the gas-hydrate-forming material is dissolved into liquid water and the clathrate is formed.

2. Method according to claim 1, wherein the continuous phase at least predominantly comprise liquid gas-hydrate-forming material.

3. Method according to claim 2, wherein the continuous phase has a lower solidification point than the clathrate-forming temperature under the same conditions, and wherein the method further comprises controlling the temperature such that the continuous phase does not solidify and thereafter separating the clathrate particles from the continuous phase.

4. Method according to claim 2 wherein the method further comprises lowering the temperature after the clathrate formation to freeze at least some of the continuous phase containing the clathrate particles.

5. Method according to claim 2, wherein the gas-hydrate forming material is $CO_2$.

6. Method according to claim 1, wherein the continuous phase is liquid and is selected such that the gas-hydrate-forming material is more soluble in the continuous liquid phase than in the water phase.

7. Method according to claim 6, wherein the continuous phase has a lower solidification point than the clathrate-forming temperature under the same conditions, and wherein the method further comprises controlling the temperature such that the continuous phase does not solidify and thereafter separating the clathrate particles from the continuous phase.

8. Method according to claim 1, wherein the continuous phase has a lower solidification point than the clathrate-forming temperature under the same conditions, and wherein the method further comprises controlling the temperature such that the continuous phase does not solidify and thereafter separating the clathrate particles from the continuous phase.

9. Method according to claim 1, wherein the method further comprises lowering the temperature after the clathrate formation to freeze at least some of the continuous phase containing the clathrate particles.

10. Method according to claim 1, wherein the gas-hydrate-forming material is carbon dioxide and the continuous phase comprises an oil.

11. Method according to claim 1, wherein the gas-hydrate-forming material is $CO_2$.

12. Method according to claim 1 wherein the water includes small amounts of other compatible compounds.

* * * * *